United States Patent [19]
Fulgenzi et al.

[11] Patent Number: 5,387,028
[45] Date of Patent: Feb. 7, 1995

[54] OCCUPANT HARNESS

[75] Inventors: Lynda K. Fulgenzi, Dearborn Heights; Jeffrey L. Goins, New Haven, both of Mich.

[73] Assignee: Ford Motor Company, Dearborn, Mich.

[21] Appl. No.: 162,250

[22] Filed: Dec. 6, 1993

[51] Int. Cl.[6] .............................................. B60R 22/14
[52] U.S. Cl. .................... 297/470; 297/467; 297/468
[58] Field of Search .................. 297/256.15, 467, 468, 297/484, 486, 487, 465, 488, 470; 24/630, 633

[56] References Cited

U.S. PATENT DOCUMENTS

| | | | |
|---|---|---|---|
| 3,147,995 | 9/1964 | Bohlin | 297/468 |
| 3,540,775 | 11/1970 | Defleur | 297/468 X |
| 3,834,758 | 9/1974 | Soule | 297/484 |
| 4,033,622 | 7/1977 | Boudreau | 297/250 |
| 4,040,664 | 8/1977 | Tanaka et al. | 297/389 |
| 4,436,341 | 3/1984 | Converse | 297/250 |
| 4,540,218 | 9/1985 | Thomas | 297/467 |
| 4,762,369 | 8/1988 | Nicod | 297/484 |
| 5,125,718 | 6/1992 | Czernakowski et al. | 297/468 X |
| 5,220,713 | 6/1993 | Lane, Jr. et al. | 24/633 X |

FOREIGN PATENT DOCUMENTS

| | | | |
|---|---|---|---|
| 1085793 | 10/1967 | United Kingdom | 297/484 |
| 1172778 | 12/1967 | United Kingdom | 297/468 |
| 1187677 | 4/1970 | United Kingdom . | |

*Primary Examiner*—Laurie K. Cranmer

[57] ABSTRACT

An occupant harness is described for an occupant seat in a motor vehicle, the motor vehicle including a pair of belts secured thereto at opposite ends of each belt and a buckle device secured to the motor vehicle. The harness comprises a pair of tongue members each interlaced with a respective one of the belts, the pair of tongue members being pivotably connected to each other so as to pivot from a first open position not in engagement with the buckle device to a second closed position so that each tongue member engages the buckle device.

11 Claims, 3 Drawing Sheets

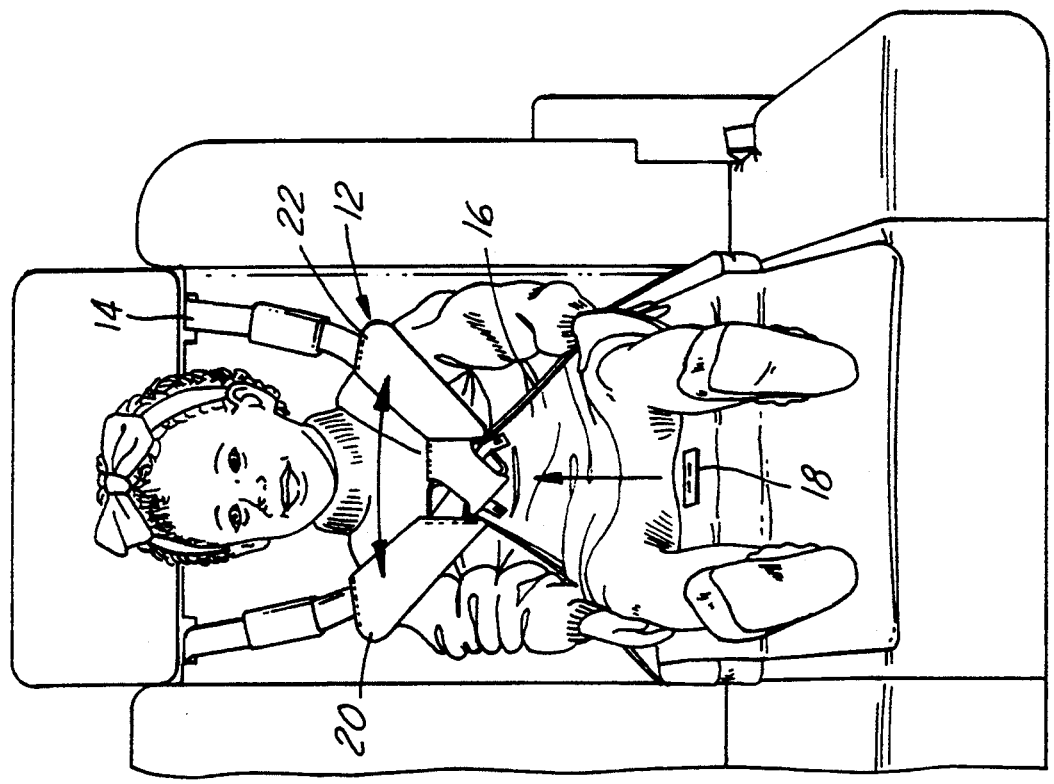
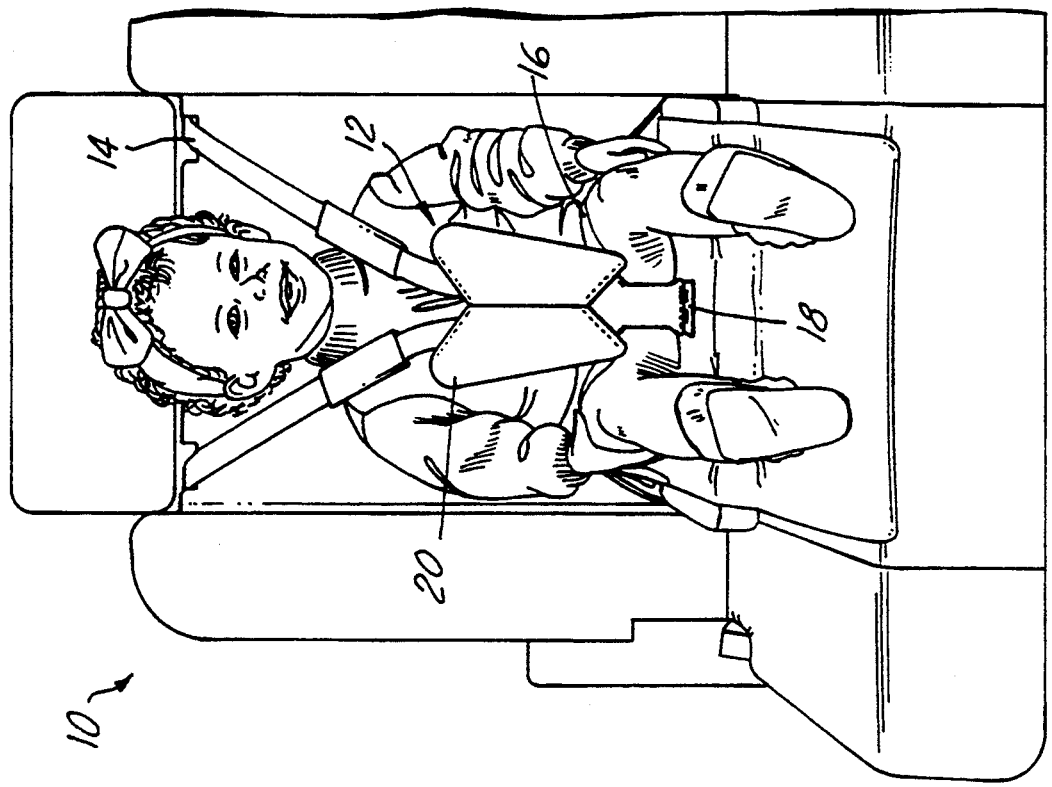

OCCUPANT HARNESS

FIELD OF THE INVENTION

This invention relates to occupant restraints for motor vehicles. More particularly, the present invention relates to a an occupant harness for restraining an occupant within an occupant seat mounted in a motor vehicle.

BACKGROUND OF THE INVENTION

Occupant restraint systems utilizing multiple shoulder and lap belts are well known. Ingress and egress of an occupant can be inconvenient with such a multi-belt configuration. Such a system requires the occupant or another person to individually secure each belt to a buckle device and separately adjust the length of each belt to fit the occupant.

U.S. Pat. No. 4,762,369 represents one improvement of such a system by providing a harness which unites several belts into a common harness. The harness enables insertion of multiple belts into the buckle device with a single insertion step. Harnesses such as those disclosed in the '369 patent have a common drawback. As the harness is placed over the occupant's head, the belts are uncomfortably raked over the occupant's head. To avoid this, extra effort is required to spread and hold the belts apart as the harness is drawn down over the occupant's head.

It would be desirable to provide a harness that would allow the belts to be drawn over an occupant's head without uncomfortably raking the occupant's head.

SUMMARY OF THE INVENTION

The present invention advances beyond the systems described above by providing an occupant harness for an occupant seat in a motor vehicle, the motor vehicle including a pair of belts secured thereto at opposite ends of each belt and a buckle device secured to the motor vehicle. The harness comprises a pair of tongue members each interlaced with a respective one of the belts, the pair of tongue members being pivotably connected to each other so as to pivot from a first open position not in engagement with the buckle device to a second closed position so that each tongue member engages the buckle device.

It is an advantage of the present invention to provide a harness capable of being pivoted into an open position, which increases the space between the belts, so as to make pulling the belts over the head of an occupant more comfortable.

Other objects, features and advantages of the present invention will become apparent to those skilled in the art from the drawings, detailed description and claims which follow.

BRIEF DESCRIPTION OF THE DRAWINGS

FIGS. 6A and 6B are front elevational views illustrating the articulation of the harness in relation to a motor vehicle occupant according to the present invention.

DESCRIPTION OF THE PREFERRED EMBODIMENTS

Figure 1:
FIG. 1 is a perspective view of an occupant in a seat including a harness according to the present invention.

Referring now to FIG. 1, an occupant seat 10 for a motor vehicle is shown having a harness 12 for restraining an occupant of the motor vehicle. The occupant restraint system includes a pair of seat belts 16 and a buckle device. The buckle device and the belts 16 are securely fastened to either the frame (not shown) of the occupant seat 10 or the structure of the motor vehicle (not shown), as is commonly known.

Figures 2, 3:
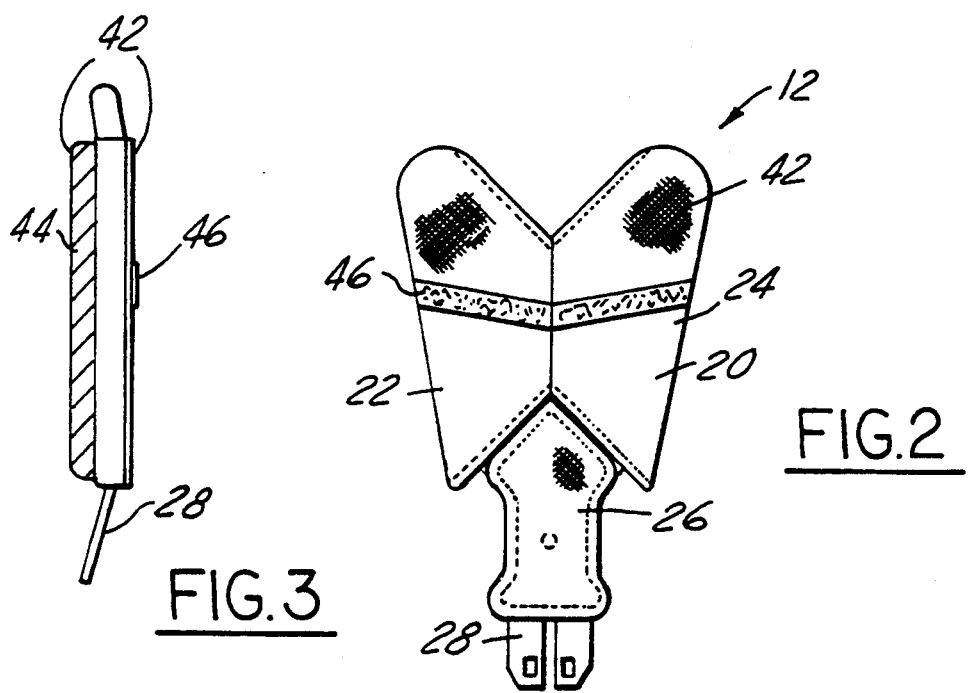
FIG. 2 is a front elevational view illustrating a padded harness according to the present invention.
FIG. 3 is a side elevational view illustrating a harness according to the present invention.

Referring now to FIG. 2, the harness 12 includes a pair of tongue members 20 and 22. The tongue members are symmetrically opposite right and left members. To simplify the description of the tongue members, only one will be described, it being understood that the description applies to both members.

As shown in FIGS. 2 and 3, a fabric sheath 42 covers the tongue member 20. The sheath maintains an energy absorbing pad 44 between the occupant and the tongue member 20. The pad 44 can be constructed from known energy absorbing, semi-rigid foams, such as polyurethane foam. Additionally, a hook and loop fastener device 46 may be disposed on the forward surface of the sheath 42. Only one hook portion of the hook and loop fastener 42 need be provided, however, since fabric of the seat 10 functions as the loop portion of the hook and loop fastener device 46.

Figure 4:
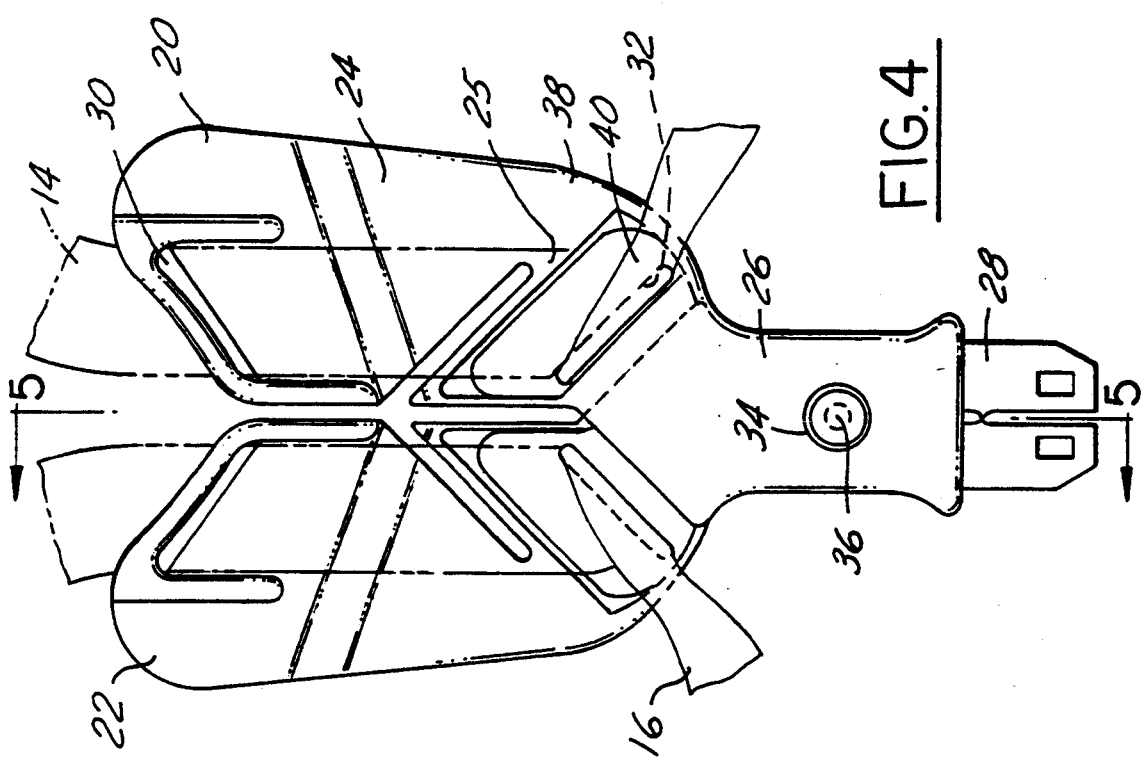
FIG. 4 is a front elevational view illustrating the articulation of the harness with the pad removed according to the present invention.
Figure 5:
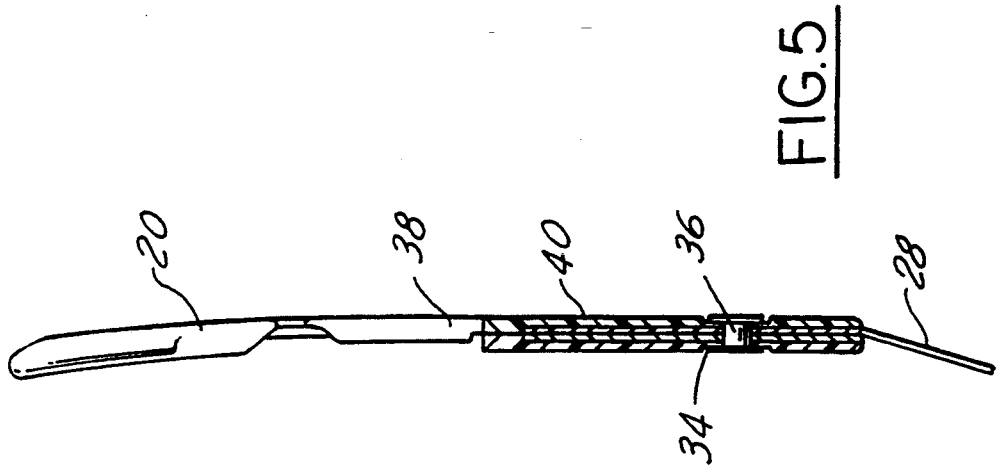
FIG. 5 is a sectional view of a harness taken along line 5—5 of FIG. 4 according to the present invention.

Referring now to FIGS. 4 and 5, tongue member 20 includes an upper portion 24, an intermediate portion 26 and a tongue portion 28. The upper portion 24 includes an upper slot 30 and a lower slot 32. Additionally, the upper portion 24 may include a living hinge 25 disposed parallel and adjacent to the lower slot 32. The intermediate portion 26 extends from just below the lower side 32 downward to the tongue portion 28. The intermediate portion 26 includes an aperture 34 for receiving a fastener 36 therethrough. The fastener 36 interconnects the two tongue members 20 and 22 permitting the tongue members 20 and 22 to rotate relative to one another about the axis of the fastener. The tongue portion 28 extends from the bottom of the intermediate portion 26 and engages a conventional buckle device 18.

The preferred embodiment of the present invention contemplates a tongue member 20 comprised of two separate parts, a torso member 38 and a pelvic member 40. The torso member 38 overlaps pelvic member 40 from the lower slot 32 downward to the tongue portion 28. The torso member 38 extends from the upper slot 30 on the upper portion 24 downward to the junction of the intermediate portion 26 and the tongue portion 28. The pelvic member 40 extends from the lower slot 32 downward through the tongue portion 28.

The torso member 38 of the preferred embodiment is constructed from a substantially flexible synthetic polymeric material, such as polypropylene. The pelvic member 40 is formed from a substantially rigid material, such as a stamped metal blank. However, the present invention is not so limited. Construction of the entire tongue member 20 from a single material, such as a single piece metal blank or single piece of polypropylene is clearly comprehended.

In the preferred embodiment a single piece shoulder belt 14 and lap belt 16 are interwoven through the upper slot 30 and the lower slot 32. It should be obvious to one skilled in the art, however, that the equivalent functionality and operability could be obtained using a separate shoulder belt 14 and a separate lap belt 16, secured to harness 12.

Referring now to FIGS. 6A and 6B, operation of the harness will be described. FIG. 6A illustrates an occupant properly restrained in the occupant seat 10. First the harness 12 is disengaged from the buckle device 18 and the tongue portions 28 are raised out of the buckle device 18. As shown in FIG. 6B, the tongue members 20 and 22 can be opened to increase the space between belts 16 so that the harness 12 and belts 16 can be comfortably raised over the occupant's head. The harness 12 may be fastened to the seat 10 with the hook and loop fastener 46 by pressing the harness 12 against the seat 10. At this point the occupant can exit the seat 10.

Similarly, upon entry to the seat 10, the harness 12 is released from the hook and loop fastener 46 by pulling the harness 12 away from the seat 10. With the tongue members 20 and 22 in the open position, the harness 12 and belts 16 can be comfortably lowered over the occupant's head. Next, the tongue members 20 and 22 are rotated to a closed position and inserted to engage the buckle device 18.

Various other modifications and permutations of the present invention, no doubt, will occur to those skilled in the art. For example, various methods of adjusting the length of the belts are contemplated. One example includes the use of conventional retractors located in the occupant seat 10 or mounted on the structure of the motor vehicle. Therefore, it is the following claims, including all equivalents, which define the scope of the present invention.

We claim:

1. An occupant harness for an occupant seat in a motor vehicle, the motor vehicle including a pair of belts secured thereto at opposite ends of each belt and a buckle device secured to the motor vehicle, said harness comprising:
   a pair of tongue members each interlaced with a respective one of said belts, said pair of tongue members being pivotably connected to each other so as to pivot from a first open position not in engagement with said buckle device to a second closed position so that each tongue member engages said buckle device.

2. An occupant harness as claimed in claim 1, wherein each of said tongue members includes an upper sloe and a lower slot adapted to receive one of said belts therethrough, said belt being slidably disposed within said upper slot and said lower slot.

3. An occupant harness as claimed in claim 1, wherein each of said tongue members includes an energy absorbing pad disposed on a portion of said tongue member between said tongue member and an occupant of the vehicle.

4. An occupant harness as claimed in claim 1, wherein said harness further comprises means for securing said harness to said seat, said means comprising a hook and loop fastener having a hook portion disposed on a forward surface of at least one of said tongue members to engage a mating loop portion disposed on said seat.

5. An occupant harness as claimed in claim 1, wherein each of said tongue members comprises:
   a substantially flexible torso member having an upper torso portion and a lower torso portion; and
   a substantially rigid pelvic member having an upper pelvic portion, an intermediate pelvic portion having an aperture, and a lower pelvic portion, said lower pelvic portion being adapted to engage said buckle device, said upper pelvic portion being adapted to engage said lower torso portion of said torso member.

6. An occupant harness as claimed in claim 5, wherein each of the torso members includes a living hinge integrally disposed on an outside edge of said torso member, adjacent to said lower torso portion.

7. An occupant harness for an occupant seat in a motor vehicle, the motor vehicle including a pair of belts secured thereto at opposite ends of each belt, said occupant harness comprising:
   a pair of tongue members, each having an upper portion, an intermediate portion having an aperture, and a tongue portion, said tongue portion being adapted to engage a buckle device that is attached to said vehicle;
   wherein each of said upper portions of said tongue members includes an upper slot and a lower slot, said slots being adapted to receive one of said belts therein, said belt being slidably disposed within said upper slot and said lower slot; and
   a fastener disposed through each of said apertures in said intermediate portions, said fastener defining a pivot axis, said fastener being adapted to allow said tongue members to pivot relative to one another about said pivot axis, from a closed position to an open position, allowing a greater distance between said belts in the open position than in the closed position.

8. An occupant harness as claimed in claim 7, wherein each of said tongue members further comprises an energy absorbing pad disposed thereon tongue member between tongue member and an occupant of the vehicle.

9. An occupant harness as claimed in claim 7, said harness further comprising means for securing said harness to said seat, said means comprising a hook and loop fastener having a hook portion disposed on a forward surface of at least one of said tongue members to engage a mating loop portion disposed on said seat.

10. An occupant harness as claimed in claim 7, wherein each of the tongue members includes a living hinge integrally disposed on an outside edge of said member, between said upper portion and said intermediate portion.

11. An occupant harness as claimed in claim 7, one of said belts is a shoulder belt received in said upper slot, and the other one of said belts is a lap belt received in said lower slot.

* * * * *